March 19, 1957 L. E. SPROUSE 2,785,850
TWO PIECE BLOWER WHEEL
Filed June 21, 1954 3 Sheets-Sheet 1

INVENTOR
LOWELL EUGENE SPROUSE,
BY Herbert A. Minturn,
ATTORNEY

March 19, 1957 L. E. SPROUSE 2,785,850
TWO PIECE BLOWER WHEEL

Filed June 21, 1954 3 Sheets-Sheet 2

INVENTOR
LOWELL EUGENE SPROUSE,
By Herbert A. Minturn,
ATTORNEY

March 19, 1957 L. E. SPROUSE 2,785,850
TWO PIECE BLOWER WHEEL
Filed June 21, 1954 3 Sheets-Sheet 3

INVENTOR
LOWELL EUGENE SPROUSE,
BY Herbert A. Minturn,
ATTORNEY

United States Patent Office 2,785,850
Patented Mar. 19, 1957

2,785,850

TWO PIECE BLOWER WHEEL

Lowell Eugene Sprouse, Columbus, Ind., assignor to Vernco Corporation, Columbus, Ind., a corporation of Indiana Application June 21, 1954, Serial No. 438,109

3 Claims. (Cl. 230—134)

This application is a continuation in part of my prior application Serial No. 394,271 filed November 25, 1953, in the United States Patent Office now Patent No. 2,771,241. This invention relates to a blower wheel such as may be used in oil burners, automobile heaters, and the like, where it is desirable that there be delivered a large volume of air as compared to the in-put power for driving the wheel.

The wheel is made out of essentially two parts (not including the hub) whereby it may be stamped out of a flat sheet of metal, blades turned upwardly from a back plate, and outer end portions beyond the blade proper in each instance abut one another circumferentially around the wheel and have these outer portions enclosed within a ring formed thereover.

By use of my invention, an exceedingly rigid and durable wheel is provided, requiring no welding or riveting.

These and many other objects and advantages which will become apparent to those versed in the art will become apparent in the following description of the one particular form of the invention as illustrated in the accompanying drawings, in which.

Figure 8:
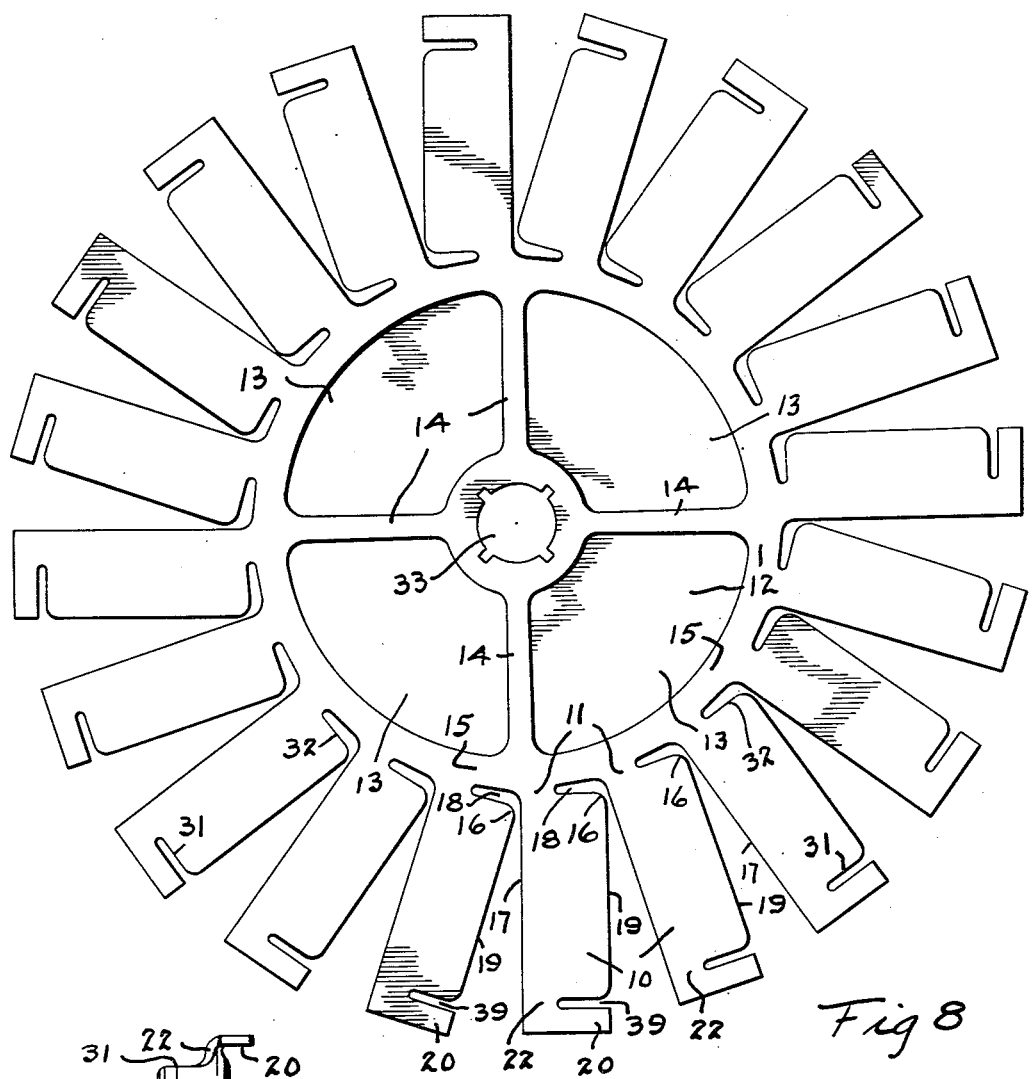
Fig. 8 is a view of the wheel in blanked out form.
Figure 9:
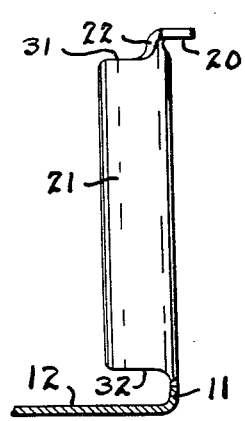
Fig. 9 is a view of a single blade upset from the wheel back plate.

Referring first to Figs. 8 and 9, a sheet of metal is blanked out to the shape shown in Fig. 8 wherein there are provided a plurality of flat radially extending blade forms 10 attached by a narrow neck 11 to a generally circular back plate 12. This plate 12 may be flat or conical in shape, but is herein shown as being generally flat with depressed areas 13, herein shown as four in number, to leave reinforcing ribs 14 extending radially out into the outer circumferential portion 15 from which the blade forms 10 extend through the necks 11. It is to be noted that in each instance, what would be the lower or inner corner 16 of the blade form 10 is in very close proximity to the straight edge 17 of the form. There is a cutaway portion 18 extending a major portion inwardly from the outer free edge 19 of the blade form 10 circumferentially along the rim portion 15.

Also at the outer end of the blade form 10, there is a slot 39 entering circumferentially from the edge 19 to leave a finger 20 out beyond the slot 39.

Figure 1:
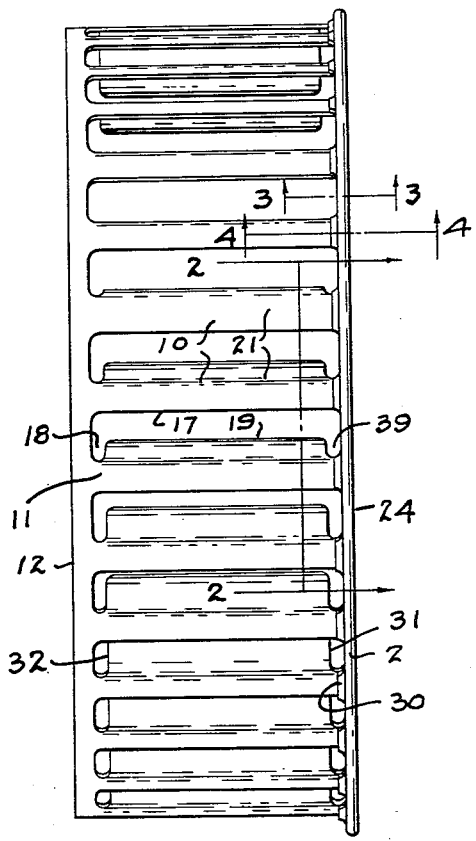
Fig. 1 is a view in side elevation of a structure embodying the invention.
Figure 2:
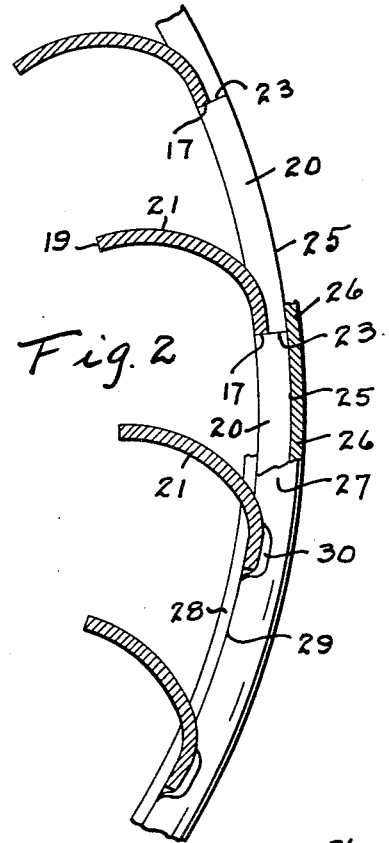
Fig. 2 is a detail on an enlarged scale in section on the line 2—2 in Fig. 1.
Figure 6:
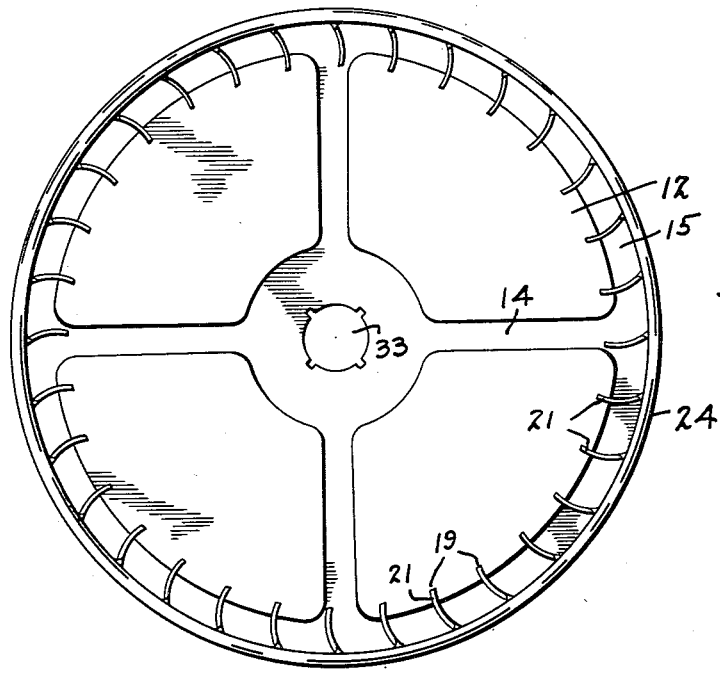
Fig. 6 is a view in front elevation.
Figure 7:
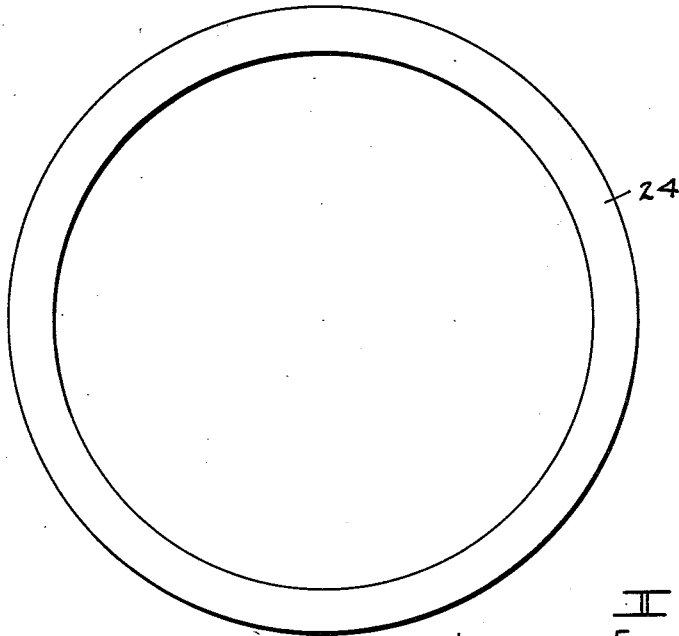
Fig. 7 is a view in front elevation of a ring blank prior to formation about the blade holding ends.

The blank as shown in Fig. 8, is then further formed to stamp each of the blade forms 10 into the desired curvature as indicated in Figs. 2, 6, and 9, preferably with a plurality of radii to give the best efficiency of air flow. Also these form blades designated by the numeral 21 in their formed shapes, are struck from the peripheral portion 15 to extend at right angles therefrom as indicated in Fig. 9, and the finger 20 is turned at right angles across the neck portion 22 as indicated in Fig. 9, this finger being turned outwardly from the blade 21. When the blades 21 are so positioned, the fingers 20 will abut one another circumferentially around the wheel, the free end 23 striking the next adjacent line 17. That is, that portion of the line 17 which is turned over when the finger 20 is turned over. This relationship is best shown in Fig. 2.

Figure 4:
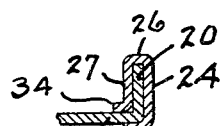
Fig. 4 is a detail in section on an enlarged scale on the line 4—4 in Fig. 1.
Figure 3:
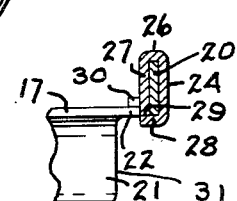
Fig. 3 is a detail on an enlarged scale on the line 3—3 in Fig. 1.

An initially flat annulus 24, Fig. 6, is relatively laid over these fingers 20 arranged in their circumferential manner as indicated, and then one side of the annulus 24 is carried around the outer edge 25 by an edge portion 26 and thence by a flanged portion 27 around under those fingers 20, and also on the opposite side there is a flange 28 turned from the annulus along the inside of the neck 22 in each instance. Preferably the flange 27 is made to be of that width where it will have a circumferential edge 29 come over into abutment with the inwardly turned flange 28, Figs. 3 and 4. In this relationship, when the flange 27 is flattened down against the under or inner sides of the fingers 20, it will have to crowd around the neck 22 in each instance, and therefore there will be in effect a slight "extrusion" of the flange 27 to extend upwardly by a portion 30 across the neck 22 in each instance, this "extrusion" serving to reinforce that neck without reaching backwardly onto the blade proper which is defined between the ends 31 and 32 in each instance. At no time does this formed annulus ever touch the edge 31.

Figure 5:
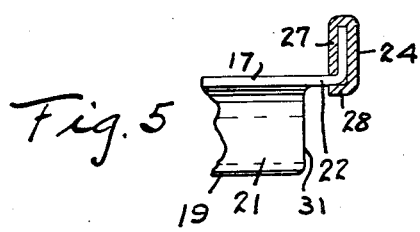
Fig. 5 is a like detail in section showing a slightly modified form of retaining ring.

It is possible and successful in operation to form the annulus 24 to extend around the fingers 20 in the manner indicated in Fig. 5, wherein the flange 27 terminates in a circumferential leg 34 entirely around the wheel on the outside of the necks 22 without extending therebetween in respect to adjacent necks. In this form, there will be no "extrusions" extending along the necks.

In effect, the annulus 24 is thus formed to wrap around and completely enclose for all practical purposes these abutting fingers 20, whereby they are held in firm abutment, and cannot fly outwardly circumferentially in respect to the turning axis of the wheel itself. The design of the blower wheel thus described lends itself very well to the use of aluminum which gives the desired lightness, and at the same time is flowable into the forms as have been described.

While I have described this unique structure in the one particular form, it is to be understood that any desired form of hub may be interengaged with the plate 12 through the center opening 33, and further that structural changes may be provided particularly in the shaping of the plate 12, the shapes of the blades 21, and the like, all without departing from the spirit of the invention, and I therefore do not desire to be limited to that precise form beyond the limitations which may be imposed by the following claims.

I claim:

1. A blower wheel comprising a back plate and a plurality of free outer end blades integrally extending from and approximately at right angles to the plane of the periphery of the plate; said blades each being slotted across a major width at their junctions with the plate to define a neck between the plate and the blade; an outer blade end finger on each blade defined by a slot entering one edge of the blade and circumferentially extending across a major width of the outer end portion of the blade; a finger neck at the inner end of said last slot integrally connecting the finger to the blade; each of said blades being transversely curved; said fingers each having a circumferential length equal to the blade width in flat form, exceeding the blade width in curved form; each of said fingers extending from its outer neck at substantially right angles thereto radially outwardly in reference to the turning axis of the wheel; adjacent ends of said fingers abutting one another circumferentially around the wheel; and separate flange means extending circumferentially around all of said fingers, maintaining said abutment.

2. The structure of claim 1 in which said flange means wraps entirely transversely around said fingers through said outer slots.

3. The structure of claim 2 in which there is an outturned portion of said flange means substantially limited in extent to be across and against the outer sides of said necks at said fingers.

References Cited in the file of this patent
UNITED STATES PATENTS

| | | |
|---|---|---|
| 1,513,763 | Rowe | Nov. 4, 1924 |
| 1,734,541 | Tedman | Nov. 5, 1929 |
| 1,892,930 | Burman | Jan. 3, 1933 |
| 2,537,805 | Wilken | Jan. 9, 1951 |
| 2,662,686 | Wuerfel | Dec. 15, 1953 |